(12) United States Patent
Cipollini

(10) Patent No.: US 6,258,476 B1
(45) Date of Patent: Jul. 10, 2001

(54) POROUS CARBON BODY WITH INCREASED WETTABILITY BY WATER

(75) Inventor: Ned E. Cipollini, Enfield, CT (US)

(73) Assignee: International Fuel Cells, LLC, S. Windsor, CT (US)

( * ) Notice: Subject to any disclaimer, the term of this patent is extended or adjusted under 35 U.S.C. 154(b) by 0 days.

(21) Appl. No.: 09/389,117

(22) Filed: Sep. 2, 1999

(51) Int. Cl.[7] .................................................... H01M 2/02
(52) U.S. Cl. ............................. 429/34; 429/12; 429/30; 429/38
(58) Field of Search ................................ 429/12, 30, 34, 429/38

(56) References Cited

U.S. PATENT DOCUMENTS 5,840,414 * 11/1998 Bett et al. ........................ 428/307.7
6,024,848 * 2/2000 Dufner et al. ...................... 204/252
6,083,638 7/2000 Taniguchi et al. ..................... 429/34

* cited by examiner

Primary Examiner—Gabrielle Brouillette
Assistant Examiner—M. Wills
(74) Attorney, Agent, or Firm—William W. Jones

(57) ABSTRACT

Solid polymer membrane fuel cell water which collects on the oxidant side of the membrane is removed from the active area of the cells in a fuel cell power plant by being absorbed into porous carbon bodies, one of which contacts the membrane. Some of the treated carbon bodies can also be used to supply water to the anode side of the membrane in order to minimize anode side membrane drying. The pores in the carbon body are partially filled, or coated, with precursors of metal oxyhydroxide compounds, which, when converted, will impart increased wettability and water absorption capacity to the carbon body. Hydroxides of the filler compounds are applied to the carbon body and are heated to convert them into oxyhydroxides. As used in this document, the term "oxyhydroxide" includes oxyhydroxides, oxyhydroxide hydrates, and oxide hydrates. Processing temperatures are low enough so as to not subject the bodies being impregnated to destabilization.

11 Claims, 3 Drawing Sheets

POROUS CARBON BODY WITH INCREASED WETTABILITY BY WATER

TECHNICAL FIELD

This invention relates to the removal of product water from the cathode side of the active area of a solid polymer fuel cell power plant, and to the provision of water to the anode side of the active area of a solid polymer fuel cell power plant. The water may be removed from the cathode side of the membrane surface, and/or supplied to the anode side of the membrane surface, by porous carbon plates which have been rendered highly wettable and hydrophilic by partially filling the pores of the carbon plates with certain metal oxyhydroxides.

BACKGROUND ART

Solid polymer membrane (PEM) fuel cell power plants create water on the oxidant reactant surface of the membrane electrode assembly, i.e., the cathode, through electrochemical combination of protons and oxygen on catalyst particles. The water thus produced is commonly referred to as "product water". In addition to product water, water may also accumulate at the oxidant reactant surface, i.e. the cathode, due to the "drag" of water molecules (drag water) in the membrane by the protons formed at the anode during the electrochemical oxidation of hydrogen by a phenomenon known as electro-osmosis. If product and drag water is allowed to uncontrollably accumulate on the oxygen reactant surface of the electrolyte membrane, the accumulated water can impede, and can even prevent oxygen from reacting with protons. Uncontrolled accumulation of water as described above will thus prevent completion of the electrochemical fuel cell process, with the result that the performance of the fuel cell will decrease, and will eventually cause the fuel cell to shut down. This product and drag water must therefore be removed from the active area of the cathode.

Several approaches have been considered for dealing with the problem of removing product water from the cell stack active area in a fuel cell power plant. One approach is to evaporate the product water in the reactant gas stream. This approach has a disadvantage in that it requires that the incoming reactant gases be unsaturated so that the product water (and any water dragged from the anode to the cathode) will evaporate into the unsaturated reactant gas stream.

In PEM cells and PEM cell power plants that employ the aforesaid water removal approach, the reactant flow rate must be sufficiently high to ensure that the reactant stream does not become saturated with water vapor within the flow path across the active area of the cell. Otherwise, saturation of the reactant stream in the flow path across the active area will prevent evaporation of the product and drag water and leave liquid water at the electrode flow path interface. This liquid water will prevent reactant access to the active catalyst in the electrode thereby causing an increase in cell polarization, i.e., mass transport polarization, and a decrease in cell performance and power plant efficiency. Another disadvantage with the removal of product and drag water by evaporation through the use of an unsaturated reactant stream is that the solid polymer membrane itself may become dry, particularly at the reactant inlet of a cell. For a solid polymer fuel cell using perfluorinated sulfonic acid membranes, the water content of the membrane is an important component of the polymer structure. Thus drying out or localized loss of water caused by excessively high evaporation rates of product and membrane water at the reactant inlet can result in drying out of the solid polymer with a decrease in proton conductance and ultimately with the development of cracks and/or holes in the polymer membrane. These holes allow the mixing of the hydrogen and oxygen reactants, commonly called "cross over", with a resultant chemical combustion of cross over reactants; loss of electrochemical energy efficiency; and localized heating. Such localized heating can further promote the loss of water from the membrane and further drying out of the solid polymer, which can accelerate reactant cross over.

A second approach for removing product and drag water from the cathode side of the cells involves the entrainment of the product and drag water as liquid droplets in the fully saturated gas stream so as to expel the product and drag water from the cell stack active area of the power plant. This approach involves high flow rates of the reactant gas stream to sweep the product water off the surface of the electrode and through the flow field. These high flow rates require a large air circulation system and may cause a decrease in the utilization of the reactants, i.e., in the fraction of reactant (oxygen) electrochemically reacted to form water. A decrease in the utilization of the reactant gases lowers the overall efficiency of the fuel cell power plant and requires a larger capacity pump and/or blower to move the reactant stream through the flow field in order to entrain the product water. At very high current densities, oxidant utilizations as low as 5% are necessary to remove the product water. Alternatively, the reactant utilization may be maintained at a desired level by recycling the reactant gas through the power plant. Recycling, however, requires an additional blower and a means for removing the entrained product water, both of which result in a parasitic loss in overall efficiency for the solid polymer fuel cell power plant. It will be appreciated that this solution to the problem of dealing with product and drag water is very complex and expensive.

Another solution to the problem of product and drag water at the cathode side of the cells is disclosed in Austrian Patent No. 389,020 which describes an ion-exchange membrane fuel cell stack that utilizes a fine pore water coolant plate assemblage to provide passive cooling and water management control in the cells in a power plant. The Austrian system utilizes a water-saturated fine pore plate assemblage between the cathode side of one cell and the anode side of the adjacent cell to both cool the cells and to prevent reactant cross-over between adjacent cells. The fine pore plate assemblage is used to move product water away from the cathode side of the ionexchange membrane and into the coolant water stream. The preferred directional movement of the product and coolant water is accomplished by forming the water coolant plate assemblage in two parts, one part having a pore size which will ensure that product water formed on the cathode side will be wicked into the fine pore plate and moved by capillarity toward the water coolant passage network which is inside of the coolant plate assemblage. The coolant plate assemblage also includes a second plate which has a finer pore structure than the first plate, and which is operable to wick water out of the water coolant passages and move that water toward the anode by capillarity. The fine pore and finer pore plates in each assemblage are grooved to form the coolant passage network, and are disposed in face-to-face alignment between adjacent cells. The finer pore plate is thinner than the fine pore plate so as to position the water coolant passages in closer proximity with the anodes than with the cathodes.

The aforesaid solution to water management and cell cooling in ion-exchange membrane fuel cell power plants is difficult to achieve due to the quality control requirements of the fine and finer pore plates, and is also expensive because the plate components are not uniform in thickness and pore size.

The Austrian approach requires that the porous body be filled with water at all times. If, at any time, the porous channels should become devoid of water, the reactant gas can also escape from the active area of the cells through the porous body. This will result in a lessening of cell efficiency with possible commingling of reactant fuel and oxygen and uncontrolled combustion. Since the cell porous bodies must carry electrical current, they must be prepared from conductive material, most commonly carbon particles because of cost and weight constraints. In the experience of the present inventors, such fine pore carbon bodies operate satisfactorily for limited periods but, with time, become non-wetting for water or hydrophobic, and unable to prevent gas escape. Carbon and graphite surfaces must therefore be chemically modified to render them hydrophilic.

One type of modification is by formation of carbon oxides on the surface of the carbon particles through chemical or electrochemical oxidation. The formation of hydroxylic or carboxylic acid species on carbon surfaces is well recognized to render the carbon surface hydrophilic because of their polar nature. However, during operation of the cell the surface carbon oxides can be chemically reduced to reform the initial hydrophobic carbon surface. Thus, with time, during extended operation of the cell the porous body may empty of water and permit reactant gas to escape.

U.S. Pat. No. 4,175,165, granted Nov. 20, 1979 to O. J. Adlhart discloses a fuel cell system having ion exchange membranes and bipolar plates. The bipolar plates are treated so as to have their surfaces be rendered hydrophilic. The surface of the bipolar plates described in this patent are made hydrophilic so as to promote the channeling of water to the edges of the fuel cell assembly. In addition, the bipolar plates described in the patent are said to be gas-impermeable and act to separate adjacent cells one from the other. The plates do not contain a continuous network of pores which permit communication of fluids, either gas or liquid, between adjacent cells. The hydrophilic surface of the bipolar plates is wetted by the product and drag water and channels this water, using the gas flow channels, to the edges of the cell where it is adsorbed and collected, for example, by wicks. The material used to render the bipolar plates hydrophilic are high surface area materials or wetting agents. The materials identified in the patent are colloidal silica sols; high surface area alumina; or high surface area silica-alumina. The silica compounds suggested by this patent for rendering the carbon plate hydrophilic will perform satisfactorily for a limited time period, but the product water percolating through the plates will leach the silica compounds out of the plate so that the plate loses its hydrophilic nature. The solubility of the silica compounds is such that the hydrophilic characteristics of the silica-treated plate are lost over time. This solution is therefore not acceptable for extended use in a fuel cell power plant.

Still another solution to the problem of PEM cell plate wettability is disclosed in U.S. Pat. No. 5,840,414, granted Nov. 24, 1998. The solution described in this patent relates to a fine pore carbon plate for use in a fuel cell power plant which plate is rendered more hydrophilic by partially filling the pores of the carbon plate and also coating the walls of the carbon plates with certain metal oxide compounds. This solution to the problem is useful, but it has certain limitations. One limitation is the processing temperatures that must be reached to form the hydrophilic coatings in the plates. The processing temperatures could result in mechanical or chemical instability in the resultant product. Another limitation with the solution described in this patent relates to the degree of wettability of the metal oxide compounds. There are certain other metal compounds that are more wettable than those described in the patent which could be used to increase the hydrophilicity of the PEM cell plates. These other metal compounds do not require excessively high processing temperatures during fabrication of the fine pore plates.

DISCLOSURE OF THE INVENTION

This invention relates to a fine pore plate, which can be a carbon, or carbon-polymer composite plate, for use in a fuel cell power plant. The plate is rendered more hydrophilic by partially filling the pores of the plate, and also coating the walls of the plates with certain metal oxyhydroxide, and compounds. The aforesaid compounds should have a solubility in water that is less than about $10^{-6}$ moles per liter, and preferably less than about $10^{-8}$ moles per liter, so as to provide extended operating life. Suitable metal oxyhydroxides include oxyhydroxides of tin, aluminum, niobium, tantalum, titanium, ruthenium, gallium, hafnium, indium, zinc, and zirconium, for example. Appropriate metal oxyhydroxide compounds or mixtures thereof may be used in practicing the invention. When the pores of the carbon plate are partially filled with the metal oxyhydroxide compound, the plate becomes highly wettable by water, and the gas pressure differential which may be applied to the plate increases without the danger of breakthrough of the reactant gas.

The metal oxyhydroxide compounds which are used should be stable under the conditions of operation of the membrane cell, and should not dissolve in the product water under cell operating conditions. Marcel Pourbaix in his "Atlas of Electrochemical Equilibria" (Gauthier-Villars and Co., Publishers, Paris 1963) has established the solubility of many metal oxides in water at various values of pH and electrochemical potential. He shows that silica, in its various solid forms, has a solubility in water at neutral pH of about 7 that lies between $10^{-6}$ and $10^{-2}$ moles per liter. By contrast, he shows that other refractory oxides such as aluminum oxide trihydrate, hydrargillite, and the oxide hydrate $Al_2O_3 \cdot 3 H_2O$ have a solubility in water at pH 7 that falls below about $10^{-6}$ moles per liter. I have determined that white stannic hydroxide $[SnO(OH)_2]$ has a solubility that falls below about $10^{-8}$ moles per liter. The aforesaid oxides will therefore be much more suitable than silica for modification of a fine pore plate to render the plate hydrophilic. The wettable compounds of this invention can be applied to the pores and walls of the transfer plates at lower temperatures.

It is therefore an object of this invention to provide a product water transfer plate for use in a solid polymer fuel cell assembly.

It is an additional object of this invention to provide a plate of the character described which is highly wettable by product water formed during cell operation.

It is a further object of this invention to provide a plate of the character described which has an extended useful life and does not degrade under cell operating conditions.

BRIEF DESCRIPTION OF THE DRAWING

These and other objects and advantages of the invention will become more readily apparent from the following detailed description of an embodiment of the invention when taken in conjunction with the accompanying drawings in which.

BEST MODE FOR CARRYING OUT THE INVENTION

Figure 1:
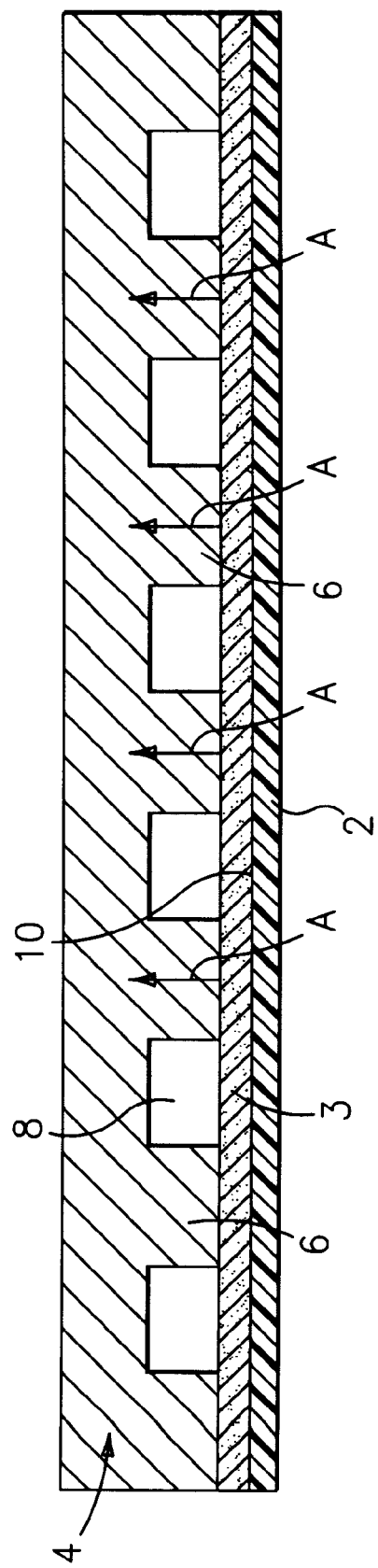
FIG. 1 is a schematic sectional view of one side of a solid polymer fuel cell formed in accordance with this invention.
Figure 2:
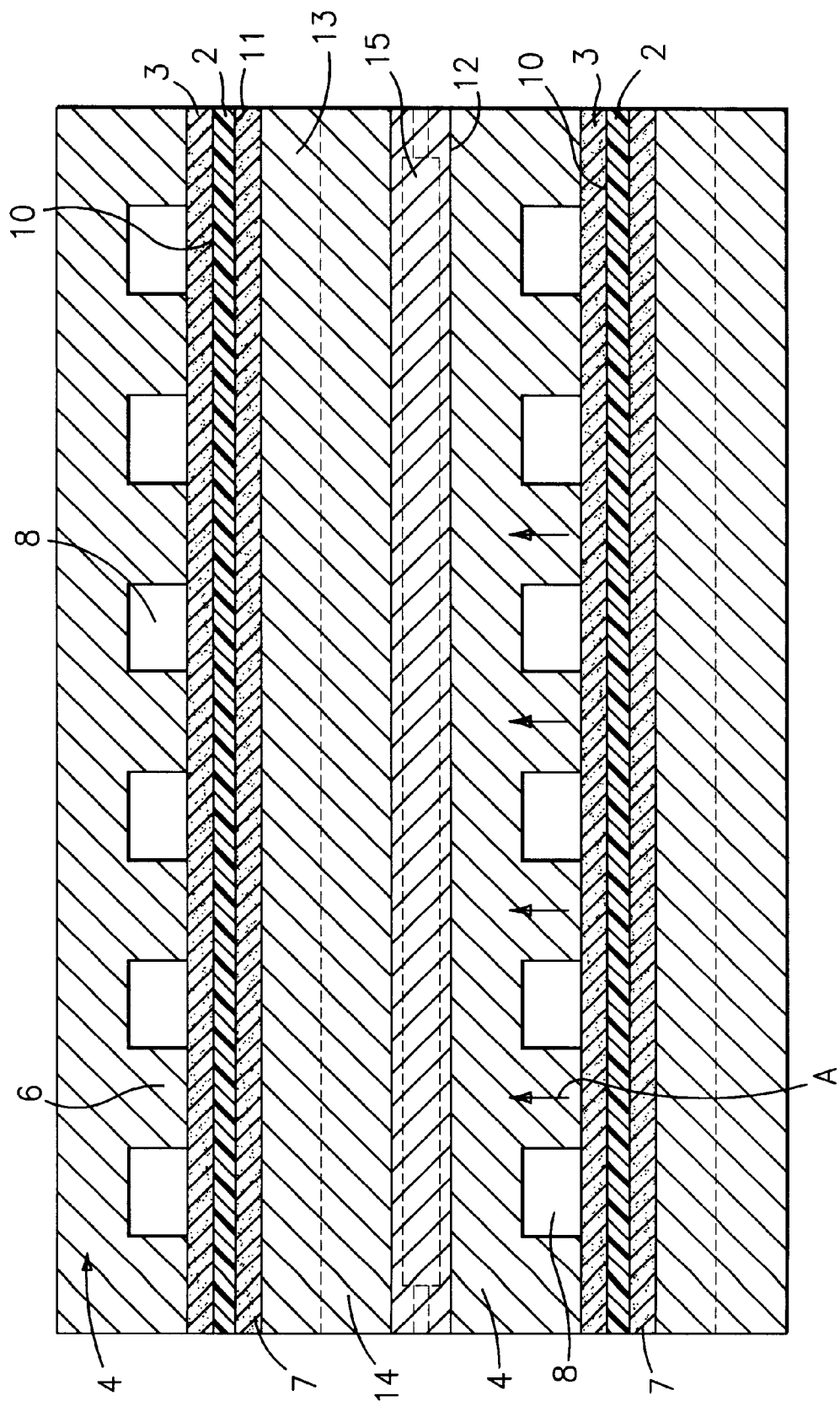
FIG. 2 is a schematic sectional view of a pair of adjacent cells.

Referring to the drawings, the solid polymer electrolyte film denoted by the numeral 2 has a porous cathode catalyst layer 3 disposed on one surface 10, and a porous anode catalyst layer 7 disposed on an opposite surface 11. The product water transfer plate which is denoted by the numeral 4, takes the form of a cathode reactant gas flow field plate which has alternating ribs 6 and gas reactant flow path channels 8. The ribs 6 on the member 4 contact the porous cathode catalyst layer 3 and are thus operable to transfer product water away from the catalyst layer 3. The side 12 of the product water transfer member 4 opposite to the ribs 6 forms a wall of the coolant water channel 15 through which coolant water flows.

An anode reactant flow field plate 13 has ribs which contact the anode catalyst layer 7 in the same manner as the cathode reactant flow field plate 4. The configuration of the anode flow field plate 13 is identical to the cathode reactant flow field plate 4 but is disposed orthogonally to the cathode reactant flow field plate 4, thus the anode flow field plate ribs are not evident in the drawings. The surface of the anode gas flow field plate 13 opposite its ribs contacts a gas impermeable member 14 which, in turn, contacts the coolant water channel 15 in the product water transfer member 4 of the adjacent cell.

When the cell is in typical operation, hydrogen electrochemically reacts in the anode catalyst layer 7 to form protons which migrate through the membrane 2 to electrochemically react with oxygen in the cathode catalyst layer 3 to form product water. If the product water is not removed, it will accumulate in the pores of the cathode catalyst layer 3 and eventually impede access of oxygen to the cathode catalyst. In order to mitigate this deleterious effect of product water accumulation, the water transfer member 4 will move product water away from the cathode catalyst layer 3. By application of appropriate reactant gas pressures in the cathode reactant gas channels 8, product water withdrawn from the cathode catalyst layer 3 can be pumped through the transfer member 4 in the direction of arrows A into the coolant water channel 15 whereby it will be removed from the cells. The presence of product water in the transfer member 4 prevents the cathode reactant gas from migrating from the gas passages 8 through the transfer member 4 to the coolant water channel 15. In order to enhance the ability of the member 4 to transfer product water from the cathode catalyst layer 3 to the coolant water channel 15, the pores of the transfer member 4 are partially filled with appropriate metal oxyhydroxide, metal oxyhydroxide hydrate or metal oxide hydrate compounds.

As previously noted, the plate 4 is preferably formed from carbon particles bonded together to form a fine pore structure, i.e., a structure having pore sizes in the range of about 1 to about 2 microns. The pores in the plate 2 can be partially filled with metal oxyhydroxide, metal oxyhydroxide hydrate, or metal oxide hydrate compounds which adhere to the carbon particles; or the aforesaid compounds can be chemically formed in situ on the surface of the carbon particles. The aforesaid compounds can be an integral part of the porous carbon body and included in the porous body when it is formed; or the compounds can be deposited in the pores of a pre-fabricated porous carbon body.

The following is an example of a procedure for forming a porous carbon member having enhanced wettability in accordance with this invention.

A solution of 0.5M tin tetrachloride pentahydrate ($SnCl_4 \cdot 5 H_2O$) in water having a pH of about 0.4 was made. The aforesaid solution could also be a 2/1 mixture of water and isopropyl alcohol. Immediately before impregnation, ammonium hydroxide was added to the solution to bring the pH up to about 1.0. Approximately 2.8 moles of hydroxide per mole of tin was added. The porous fine pore plate was vacuum impregnated with the solution. After impregnation, the plate was heated to a temperature of about 195° F. for a period of about 30 minutes to hydrolyze the tin salt and increase the size of the salt crystals. Sufficient humidity is maintained during the heating step to prevent drying of the solution. The impregnated fine pore plate was then dried at about 240° F., and heated to a temperature of below about 400° F., preferably about 300° F., for about two hours. The dried plate was then washed in water to remove ammonium chloride from its surfaces. The resultant fine pore plate had a porosity, as characterized by its void volume, of between 0.35 to 0.45 void volume/total volume. The resulting fine pore plate contained tin oxyhydroxide at a loading of between about fifteen to about forty mg/g of the fine pore plate. The precise loading value depends on the initial porosity which defines the surface area of the fine pore carbon plate.

When the resulting fine pore plate was placed in contact with water, it absorbed the water readily in such a way as to fill its remaining void volume with water. In order to demonstrate this property of enhanced wettability, and to contrast this enhanced property with the wettability of an untreated fine pore plate, the following tests were performed.

An unmodified fine pore plate was heated in an oven at 240° F. for two hours to assure that it was free of water. It was then submersed in water and a vacuum was applied over the surface of the water. On removal of the plate from the water, and removal of water adhering to the external surface of the plate, the fine pore plate was weighed to determine the content of water in the pores. By calculation, the volume of water absorbed into the plate under vacuum equaled the total void volume of the fine pore plate, since the sum of the volume of water plus the volume of carbon in the fine pore plate was equal to the volume calculated from the external, gross dimensions of the member. The total void volume had a value of between 0.35 to 0.45 void volume/total volume as described above.

The unmodified fine pore plate was then reheated to 240° F. for two hours to remove water therefrom. The plate was then re-submersed in water at a temperature of 90° C. for one hundred sixty eight minutes, without a vacuum being applied, so that water was absorbed into the plate at ambient pressures. The measured water content of the plate after the latter submersion step was observed as being less than two percent of the amount of water absorbed by the same plate under vacuum.

The same unmodified fine pore plate was then re-submersed in the water for a period of one hundred forty two hours, at a temperature of 90° C., while air was bubbled through the water. This treatment simulated conditions in the cathode compartment of an operating fuel cell. After this treatment, the plate was once again dried at 150° C. and the amount of absorbed water in the plate was then measured in the manner described above. The amount of water absorbed by the plate was less than one percent of the void volume of the plate. Thus the amount of water absorbed by the plate was seen to have decreased as compared to the above-noted previous procedures.

The same procedures described above were used to assess the wettability and water retention characteristics of a fine pore carbon plate which was impregnated with a tin oxyhydroxide compound as described above. The initial absorption of water by the tin oxide-modified fine pore carbon plate filled ninety percent of of the fine pore plate void volume. After one hundred forty two hours in a hot aerated water bath, the water absorption increased to ninety four percent of the total void volume of the treated plate.

Fine pore carbon plates can be impregnated with oxyhydroxides, oxyhydroxide hydrates, or oxide hydrates of tin, titanium, aluminum, zirconium, gallium, indium, nobium, tantalum, ruthenium, zinc, and/or hafnium. The general formula for the compounds in question is: $M_xO_y(OH)_w \cdot z(H_2O)$, wherein the $H_2O$ component is optional, i.,e., is only included in the hydrate compounds which may be used in performance of this invention, and wherein x, Y, w and z are generally small integers, between zero and five, and preferably two or three.

Figure 3:
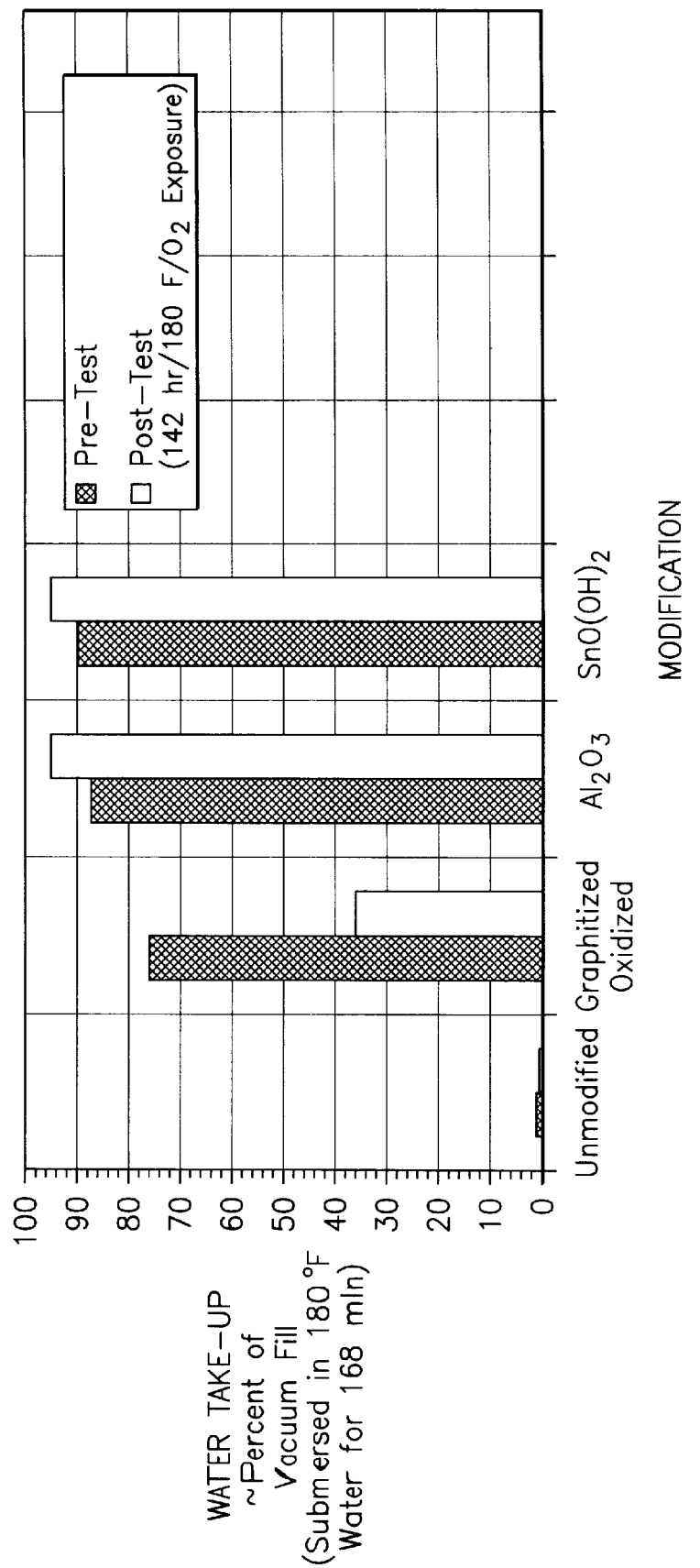
FIG. 3 is a graphic representation of the hydrophilic properties of fine pore plates which have been prepared in accordance with several different procedures.

The superior hydrophilic properties of aluminum oxide hydrate and tin oxyhydroxide-modified fine pore plates are summarized in FIG. 3. Tin oxyhydroxide, or tin hydroxide fillers for the carbon plates are preferred for practicing the invention.

It will be readily appreciated that metal oxyhydroxide, oxyhydroxide hydrate, or oxide hydrate-loaded porous plates having an appropriate solubility in water formed in accordance with this invention will efficiently transfer product water away from or toward the surface of the electrolyte membrane to prevent cell flooding or dryout, respectively. The increased wettability of the porous carbon plates will persist over extended periods of cell operating life. While the water transfer plate is preferably formed from carbon particles bonded together into a structural member, and then loaded with a suitable metal oxyhydroxide, metal oxyhydroxide hydrate, or metal oxide hydrate filler, the structural cell members could be formed from electrically conductive metal particles or fibers which are pre-formed as a porous sinter or sponge, and whose pores were also loaded with a suitable filler to enhance wettability.

Since many changes and variations of the disclosed embodiment of this invention may be made without departing from the inventive concept, it is not intended to limit the invention otherwise than as required by the appended claims.

What is claimed is:

1. A structural component for use in a fuel cell, said component being formed from material particles which are sized to provide fine pores in the component, said component being rendered hydrophilic by incorporation of a metal oxyhydroxide or oxyhydroxide hydrate compound into said pores, said compound having a solubility in water of less than about $10^{-6}$ moles per liter.

2. The component of claim 1 wherein said compound has a solubility in water of less than about $10^{-8}$ moles per liter.

3. The component of claim 1 wherein said material particles are carbon particles, or carbon-polymer composite particles.

4. The component of claim 1 wherein said compound is an oxyhydroxide, or oxyhydroxide hydrate, of a metal selected from the group consisting of tin, aluminum, niobium, ruthenium, tantalum, titanium, zirconium, gallium, hafnium, indium and zinc.

5. The component of claim 4 wherein said metal is tin.

6. A method for forming a hydrophilic fine pore structural component for use in a fuel cell, said method comprising the steps of:
   a) providing a fine pore particulate component having a pore size in the range of about 0.5 to about 2 microns;
   b) providing a solution of a salt of a metal, the oxyhydroxide or oxyhydroxide hydrate of which has a solubility in water of less than about $10^{-6}$ moles per liter;
   c) impregnating the pores of said component with said salt solution; and
   d) hydrolyzing the impregnated metal salt in the pores of the component to convert the metal salt to a metal oxyhydroxide.

7. The method of claim 6 wherein said impregnating step is performed under vacuum.

8. The method of claim 6 wherein said hydrolyzing step is performed by immersing said impregnated component in a base or salt solution having a pH of about 5 to about 10.

9. The method of claim 6 wherein said metal is tin.

10. The method of claim 6 wherein said metal is aluminum.

11. The method of claim 6 wherein said metal is a metal selected from the group consisting of tin, aluminum, niobium, ruthenium, tantalum, titanium, zirconium, gallium, hafnium, indium and zinc.

* * * * *